US005563979A

United States Patent [19]
Bruce et al.

[11] Patent Number: 5,563,979
[45] Date of Patent: Oct. 8, 1996

[54] ERBIUM-DOPED PLANAR OPTICAL DEVICE

[75] Inventors: Allan J. Bruce, Westfield; William H. Grodkiewicz, Glen Gardner, both of N.J.; Gerald Nykolak, Long Island, N.Y.; Joseph Shmulovich, Murray Hill; Yiu-Huen Wong, Summit, both of N.J.

[73] Assignee: Lucent Technologies Inc., Murray Hill, N.J.

[21] Appl. No.: 522,012

[22] Filed: Aug. 31, 1995

[51] Int. Cl.$^6$ .................... G02B 6/16; H01S 3/07
[52] U.S. Cl. .................... 385/142; 385/141; 372/6
[58] Field of Search .................... 385/142, 141, 385/143, 144, 123, 124, 125, 126; 372/6

[56] References Cited

U.S. PATENT DOCUMENTS

| | | | |
|---|---|---|---|
| 4,425,246 | 1/1984 | Holzwarth et al. | 252/8.55 |
| 4,586,785 | 5/1986 | Swinehart | 350/96.28 |
| 4,826,288 | 5/1989 | Mansfield et al. | 350/320 |
| 4,926,995 | 5/1990 | Kauffman | 193/37 |
| 5,005,175 | 4/1991 | Desurvire et al. | 372/6 |
| 5,027,079 | 6/1991 | Desurvire et al. | 330/4.3 |
| 5,119,460 | 6/1992 | Bruce et al. | 385/142 |
| 5,200,029 | 4/1993 | Bruce et al. | 156/657 |

OTHER PUBLICATIONS

Shelby, J. E. et al., "Rare–Earth Aluminosilicate Glasses", J. of the American Ceramic Soc., vol. 73, No. 1, pp. 39–42, Jan. (1990).

Kitagawa, T. et al., "Guided–Wave Laser Based on Erbium–Doped Silica Planar Lightwave Circuit", Electronics Letters, vol. 27, No. 4, pp. 334–335, (Feb. 14, 1991).

Bruce, A. J. et al., "Effect of Concentration, Host Glass Composition, and Processing on the Absorption and Emission, Eru+3d Ions in Sodium Silicate Glasses", Solid State Optical Materials, vol. 28, pp. 353–367 (Apr.–May 1991).

Primary Examiner—John D. Lee
Assistant Examiner—Phan T. H. Palmer
Attorney, Agent, or Firm—Richard J. Botes

[57] ABSTRACT

An active optical device comprises a glass, waveguiding structure disposed on a substantially planar principal surface of a substrate. The structure includes a silica-based, erbium-doped active core. The active core has an absolute erbium concentration of at least about $0.5 \times 10^{20}$ atoms per cubic centimeter, and a radiative lifetime of the erbium lasing level of at least about 5 milliseconds. The active core does not contain significant amounts of alkali metals or alkaline earth metals but does contain at least two modifier metals. Also disclosed is a method for forming an active optical device, including the step of depositing an erbium-doped active core by sputtering.

14 Claims, 2 Drawing Sheets

ERBIUM-DOPED PLANAR OPTICAL DEVICE

FIELD OF THE INVENTION

This invention relates to active optical devices, such as amplifiers, that operate by stimulated optical emission from rare-earth ions in glass, and more particularly to devices made in the form of planar optical waveguides.

ART BACKGROUND

Optical amplifiers are important in networks for distributing optical signals. Optical fiber amplifiers, made from glass that is doped with rare earth elements such as erbium, are a well-known example. For example, U.S. Pat. No. 5,119,460, issued to Bruce, et al. on Jun. 2, 1992, describes optical amplifiers with relatively high rare earth content. The optical amplifiers disclosed therein are in the form of planar waveguides deposited on silicon substrates. Planar waveguides are useful for applications such as premises distribution of optical signals, where components need to be relatively small and device integration is desirable. The optical amplifiers described in Bruce et al. contain alkali metals, alkaline earth metals, or a combination thereof, to prevent clustering of erbium atoms.

Although alkali and alkaline earth metals are effective for this purpose, glasses containing significant amounts of these materials are not entirely complementary with the silicon substrates on which they are deposited. For example, glasses that contain significant amounts of alkali and alkaline earth metals have a higher coefficient of thermal expansion than the silicon substrate, which can cause stress in the glass films when the glasses are subjected to changes in temperature typically associated with annealing and waveguide fabrication. This stress increases with film thickness and can cause films of alkali-containing and alkaline earth-containing materials such as soda-lime glasses that are greater than 2 μm thick to crack. Also, waveguides with alkali and alkaline earth metals cannot tolerate temperatures greater than 900° C. without deforming. This limits the choice of material for the upper cladding layers to materials that can be formed on the glass at temperatures less than 900° C.

Also, after the alkali or alkaline earth metal-containing glass is formed on the substrate, there can be out-diffusion of the mobile alkali metals. This can adversely affect the adhesion to the glass of the photodefinable material used to define the pattern in the waveguide structure. This out-diffusion can also adversely affect the homogeneity of the glass film and increase the defect density of the film. Also, since alkali and alkaline earth metals are detrimental to some other processes for making silicon-based devices (e.g. integrated circuits) equipment that is used to form these glasses on silicon substrates cannot be used for processing some other silicon-based devices. Consequently, glasses for optical amplifiers and optical fibers which do not contain alkali metals and alkaline earth metals are desired.

SUMMARY OF THE INVENTION

In a broad sense, the invention is an active optical device in the form of a planar optical waveguiding structure or an optical fiber. The device includes an elongated, active glass core which comprises oxygen, a nonmetallic element such as silicon or germanium, and erbium, the erbium being at least partially in the form of $Er^{3+}$ ions. The active core is about 50 mole percent to about 90 mole percent of the non-metallic element. In a preferred embodiment, the non-metallic element is silicon.

The active core further comprises a modifier material that is not an alkali metal or an alkaline earth metal. The modifier material is present in an effective quantity to prevent clustering of erbium atoms. It is advantageous if the glass contains abut 10 mole percent to about 50 mole percent of this modifier material.

The modifier material has at least two components. It is advantageous if both components contain metal oxides of metals with a valence that is greater than or equal to three. The modifier metals and theft corresponding oxides are referred to interchangeably herein. The components of the modifier material provides certain desirable properties to the glass. For example, it is advantageous if one component is a material that enhances the solubility of the $Er^{3+}$ ions in the silica. Examples of suitable metal oxides that perform this function include oxides of the Group IIIB, Group IVB, and Group IIIA metals from the Mendeleef Periodic Table. One example of this modifier component is lanthanum oxide ($LaO_3$). It is advantageous if the second component is a metal that stabilizes the glass composition. Oxides of the Group IIIA metals from the Mendeleef Periodic Table such as alumina ($Al_2O_3$) and gallia ($GaO_3$) are examples of metal oxides that perform this function. Although there is some overlap in the classes of metals from which the two metals are selected, it is important to note that the glass contains at least two metal components. For example, if aluminum is selected as one component metal, a metal other than aluminum would be selected as the second component metal.

The device further includes a glass cladding of lower refractive index, means for coupling signal radiation into and out of the active core, and means for coupling pump radiation into the active core to pump the $Er^{3+}$ ions. The cladding and core are formed such that they overlie a substantially planar principal surface of a substrate. In the active core, the absolute erbium concentration is at least about $0.5 \times 10^{20}$ atoms per cubic centimeter, and the erbium lasing level has a radiative lifetime of at least about 5 ms. It is advantageous if the absolute erbium concentration is at least about $1.4 \times 10^{20}$ atoms per cubic centimeter.

In another aspect, the invention is a method for forming an optical device on a silicon substrate having a substantially planar principal surface. The method includes, first, the step of forming a first layer of vitreous silicon dioxide on the principal surface. After that, a second layer of silica-based glass is deposited over the first layer by sputtering a target of silica-based glass containing the modifier material and erbium such that the second layer has a higher refractive index than the first layer. Significantly, the target composition is selected such that the core contains about 50 mole percent to about 90 mole percent silica, the absolute erbium concentration is at least about $0.5 \times 10^{20}$ atoms per cubic centimeter, and the target composition is further selected such that a lasing level is associated with the erbium in the core, the lasing level having a radiative lifetime of at least about 5 ms. After the sputtering step, the second layer is annealed such that it is stabilized. A portion of the second layer is subsequently removed by etching, such that an elongate core is formed. After that, a third layer of silica-based glass is deposited over the core such that the third layer has a smaller refractive index than the core.

The glasses used in the waveguides of the present invention are advantageous because, due to the absence of alkali and alkaline earth metals in significant mounts, the coefficient of thermal expansion of the glass is capable of being more closely matched to the coefficient of thermal expansion of the underlying silicon substrate in the waveguide. The more closely the coefficient of thermal expansion of the glass is matched to the coefficient of thermal expansion of the underlying substrate, the less likely it is that the glass will be stressed in response to a change in temperature. Since such stress can cause the glass to crack or polarize, it is advantageous if the coefficients of thermal expansion of the glass and the underlying substrate are similar.

Furthermore, the lanthanide rare earth metals (e.g. erbium, ytterbium) are more soluble in glass compositions that do not contain alkali or alkaline earth metals. Therefore, it is possible to incorporate more erbium in these glasses than in glasses that contain alkali and alkaline earth metals. The glasses of the present invention have refractive indices as high as 1.6 or more, which enhances optical confinement in the waveguide. This is advantageous for small, high-efficiency devices. In addition, these glasses are also capable of withstanding higher temperatures (i.e. greater than 1000° C.) after being formed on the silicon substrate. This allows a greater range of materials to be used as the cladding material formed over the glass of the present invention than the range of materials that are used as cladding materials over glasses that contain alkali and alkaline earth metals (which cannot withstand temperatures greater than 900° C. after being formed on a silicon waveguide).

DETAILED DESCRIPTION

The inventive optical amplifier is to be used to amplify optical signals by stimulated emission from $Er^{3+}$ ions. As is well known in the art, the appropriate signal wavelength is about 1.55 μm. Various wavelengths of pump radiation are readily used to excite the $Er^{3+}$ ions, as is described in greater detail below.

Figure 1:
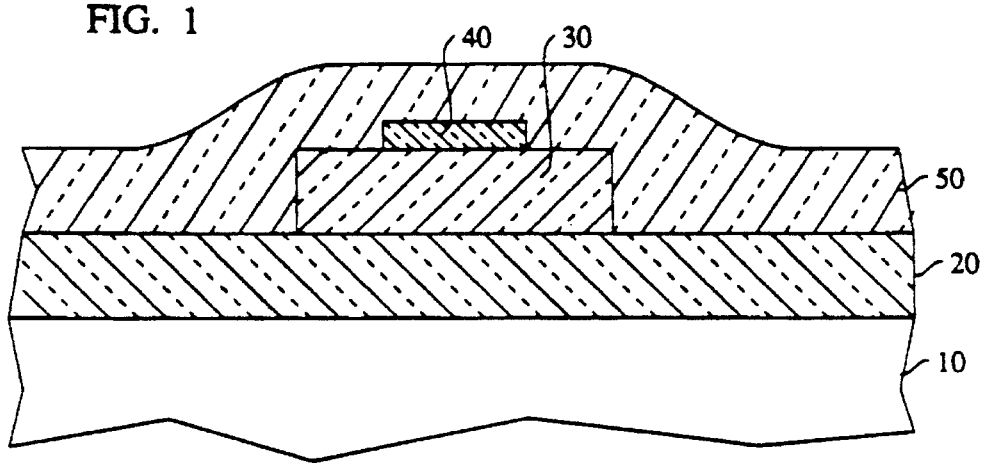
FIG. 1 is a schematic, sectional end view of the inventive waveguiding structure, according to one embodiment.

With reference to FIG. 1, a currently preferred embodiment of the inventive optical amplifier includes a silicon substrate 10, a lower cladding layer 20 overlying the substrate, a passive core 30 overlying the lower cladding layer, an active core 40 overlying the passive core, and an upper cladding layer 50 overlying the active and passive cores and the lower cladding layer. In alternative embodiments of the invention, the passive core is omitted.

As is apparent in the figure, the two cores are substantially surrounded by the two cladding layers. The refractive indices of the upper and lower cladding layers are not necessarily equal to each other. However, they should both be smaller than the refractive index of the active core, and also smaller than the refractive index of the passive core. As a consequence of the refractive index differences, electromagnetic radiation of the signal wavelength and at least one pump wavelength is guided in both the active core and the passive core. (In general, the waveguiding properties of the active and passive cores are not distinctly separable. Thus, for example, radiation guided in the active core is not guided exclusively therein, but by an effective core to which the underlying passive core also contributes.)

Preferably, the active and passive cores function as single-mode waveguides, at least with respect to the signal wavelength. Thus, signal radiation is preferably guided exclusively in the fundamental mode. However, it should be noted that alternative embodiments are envisioned in which both the active and the passive cores function as multimode waveguides with respect to both the signal and pump radiation.

The refractive index of the active core is preferably somewhat greater than the refractive index of the passive core, in order to capture the greatest possible amount of light in the active core. (For example, active and passive cores are readily made having respective refractive indices of 1.50 and 1.45.) As a consequence of such refractive index difference, electromagnetic waves that are guided in the active core will have narrower mode profiles than waves guided in the passive core. Accordingly, it is advantageous in such situations to make the active core narrower than the passive core. Such a relatively narrow active core 40 is depicted in FIG. 1.

Lower cladding layer 20 is formed on an appropriately prepared, substantially planar principal surface of substrate 10, which is exemplarily a silicon wafer. Layer 20 is exemplarily a HIPOX layer; i.e., a layer of vitreous silicon dioxide that is grown by thermal oxidation of silicon under high pressure steam according to methods that are well-known in the art. The thickness of layer 20 should be greater than about 10 μm, because optical leakage may occur at substantially smaller thicknesses. A currently preferred thickness is about 15 μm.

Passive core 30 is exemplarily made from phosphosilicate glass. The phosphorus content, and concomitantly the refractive index, of the glass is selected (with reference to the compositions of layers 20 and 50 and active core 40) to provide the desired waveguiding properties, according to methods well known in the art. A useful range of glass compositions for passive core 30 consist of silica containing up to about 8 wt. % phosphorus, and the phosphorus content more typically lies in the range 4–8 wt. %. Core 30 is exemplarily deposited on layer 20 by low-pressure chemical vapor deposition, according to methods that are well-known in the art. The thickness of the passive core is exemplarily about 5 μm, and the width of the passive core is exemplarily about 6 μm.

Active core 40 is made from a silica-based glass having a relatively high concentration of erbium, e.g., glass having an erbium-to-silicon atomic ratio of at least about 0.05, preferably at least about 0.01, and still more preferably at least about 0.02. Furthermore, the absolute erbium concentration is at least about $0.5 \times 10^{20}$ atoms per cubic centimeter. A smaller erbium-to-silicon ratio is undesirable because it could lead to an undesirably small value of signal gain per unit length of the amplifier.

The active core of the optical device of the present invention contains about 50 mole percent to about 90 mole percent of a nonmetallic element such as silicon or germanium. In a preferred embodiment the element is silicon. Various glass-modifying chemical elements (hereafter, "modifiers") are advantageously added to the glass of the active core. The active core contains a modifier that is a combination of at least two metal oxides. The metals are not alkali metals or alkaline earth metals.

The modifier components perform a variety of functions in the active core. For example, one or both of the modifiers increases the solubility of erbium in the glass thus preventing the clustering of erbium atoms at high concentrations. Certain modifiers have been found to increase erbium solubility while avoiding concentration-quenching effects, which would otherwise reduce the $Er^{3+}$ radiative lifetime below about 5 ms at relatively high concentrations (i.e., at erbium-to-silicon atomic ratios greater than about 0.01). Modifiers that are useful in this regard are the Group IIIB, Group IVB, and Group IIIA metals from the Mandeleef Periodic Table which includes metals such as lanthanum, yttrium, scandium, and aluminum. The modifiers are incorporated into the glasses as metal oxides.

The modifiers also control the homogenous and inhomogeneous broadening of the $Er^{3+}$ absorption and emission peaks. Elements such as lanthanum, yttrium, and zirconium, contribute high field-strength ions and tend to broaden the peaks.

It is advantageous if at least one of the modifiers also serves to crosslink the glass network. Such cross-linking may also increase the degree of inhomogenous broadening. Examples of metals that perform this function include aluminum and gallium. Although there is some overlap the classes of metals that perform these various functions, at least two different metals are used as modifiers in the glass of the present invention.

The modifiers enumerated above perform a variety of other functions in the glass as well. For example, aluminum and lanthanum stabilize the glass against devitrification, crystallization, and attack by moisture during or after film deposition. (Because the type of modifier and the amount of the modifier also influence the thermal expansion coefficient of the glass, it is also advantageous to adjust the composition to more closely match the thermal coefficient of the underlying substrate.)

Thus, for example, an active core glass with a relatively high solubility for erbium is readily made by incorporating in silica glass an effective amount of lanthanum. The active core class contains about 5 mole percent to about 30 mole percent lanthanum. The active core also contains about 5 mole percent to about 30 mole percent of a second modifier metal that stabilizes the glass. It is advantageous if this second modifier metal is aluminum.

The choice of the first modifier metal does not necessarily restrict the choice of the second modifier metal. However, preferably, the resulting glass is readily formed and is resistant to crystallization and phase separation during formation of the glass film on the substrate and subsequent processing. In this regard, it is advantageous of one metal (e.g. La) is selected for its effect on the solubility of $Er^{3+}$ ions in the glass and one modifier metal (e.g. Al) has a more direct influence on the properties of the glass. Optional quantities of other modifiers, such as those listed above, are usefully added in quantities that are limited, inter alia, by the ultimate refractive index desired, the relevant solubility limits, glass stability, and other physical or chemical properties of the glass, including thermal expansion coefficients.

An exemplary method for depositing active core 40 is by sputtering, as described in detail below. As noted, the refractive index of active core 40 should be greater than those of both cladding layers, and also greater than the refractive index of passive core 30. Significantly, the use of sputtering offers the advantage that the concentration of $Er^{3+}$ ions can be made substantially uniform throughout the active core. Moreover, radiation damage (which can occur when erbium doping is performed by ion implantation) is avoided.

The thickness of the active core is exemplarily about 1.5 μm. If the active core is made substantially thinner than about 1.0 μm, there will be no guided mode at the signal wavelength. The width of the active core should be at least about 2 μm, and is exemplarily about 5 μm. The total length of the active core is typically 5 mm or more.

Upper cladding layer 50 is advantageously made from boro-phosphosilicate glass, exemplarily by low-pressure chemical vapor deposition. In order to provide the desired index of refraction, an appropriate content of, e.g., phosphorus is selected according to methods well known in the art. Exemplary phosphorus and boron contents are about 2 wt. % each. The thickness of the upper cladding layer is exemplarily about 5 μm.

In use, an optical signal at a wavelength of about 1.55 μm, and pump radiation at least at one wavelength shorter than 1.55 μm, are coupled into the passive core, and from the passive core into the active core. As is well-known in the art, pump radiation is absorbed by $Er^{3+}$ ions in the active core, promoting at least some of them to the $^4I_{13/2}$ State, which is a lasing level of atomic excitation. The lasing level is not reached directly, but rather by optical excitation to any one of several excited states of still higher energy. The lasing level is reached by nonradiative decay from those higher states. Correspondingly, pump radiation is effective at any of a group of wavelengths, including 980 nm, 810 nm, 660 nm, 514 nm, and 1.48 μm.

Figure 2:
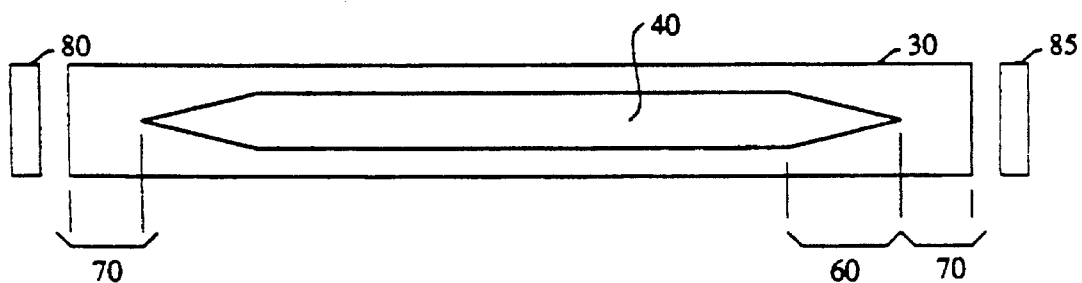
FIG. 2 is a schematic, top view of the waveguiding structure of FIG. 1.
Figure 3:
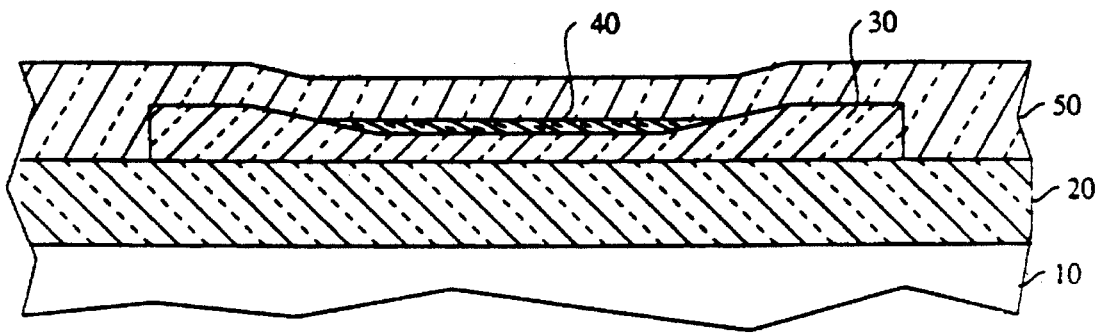
FIG. 3 is a schematic, sectional side view of the inventive waveguiding structure, according to an alternative embodiment.

In order for excitation of erbium ions, and resulting amplification, to take place, the signal and pump radiation must be coupled from the passive core into the active core, and vice versa. With reference to FIG. 2, this is readily achieved by providing the active core with tapers 60. That is, the active core has two terminal portions, each of which is progressively constricted as the corresponding end is approached. The constriction is in at least one dimension normal to the longitudinal axis of the core. The normal dimension may be transverse, as shown in FIG. 2, or, as depicted in FIG. 3, it may be vertical; i.e., normal to the orientation of the deposited layers.

In the preferred embodiment, the tapers 60 are adiabatic; that is, the signal radiation remains in the fundamental mode as it is coupled from the passive to the active core, and again when it is coupled from the active to the passive core. (In the preferred embodiment, the active and passive cores are, of course, single-mode waveguides with respect to the signal radiation.) As is well known in the art, a taper will be adiabatic only if it is relatively gradual. For example, a straight-sided taper in this context will generally be adiabatic if it has a reduction ratio of about 100:1; i.e., the original width (or depth) is constricted, in effect, down to zero over a length that is 100 times the original width (or depth). The length of each tapered region is exemplarily about 1 mm.

Figure 4:
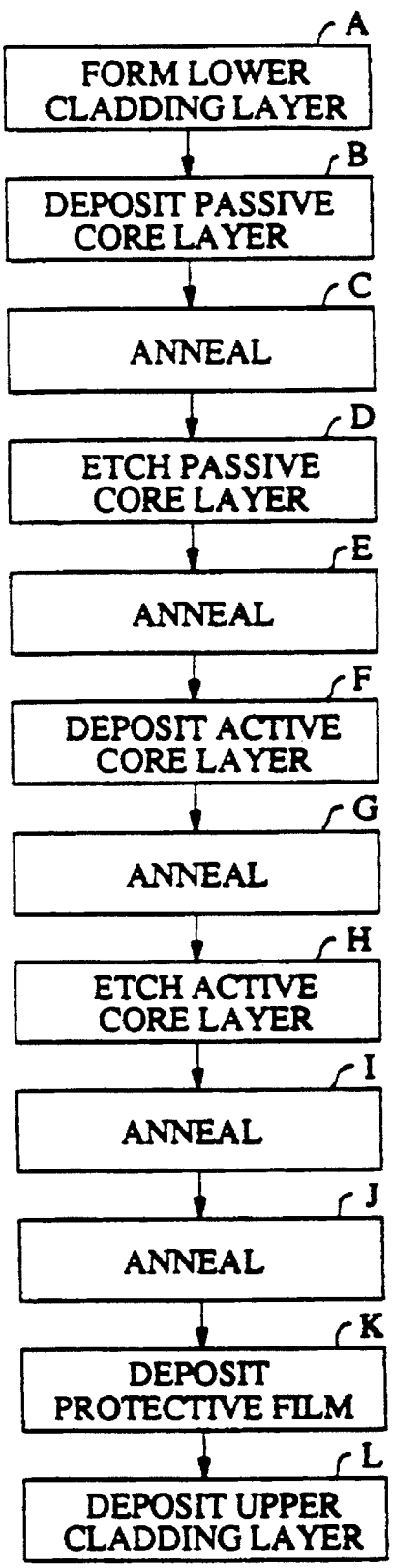
FIG. 4 is a flowchart of the steps in an exemplary process for manufacturing the inventive waveguiding structure.

Shown in FIG. 4 is a flowchart representing an exemplary sequence of steps in the fabrication of the inventive optical amplifier. The enumeration of the process steps in the following discussion is made with reference to the figure.

In Step A, the lower cladding layer is first formed.

In Step B, a layer corresponding to the passive core is then deposited on the upper surface of the lower cladding layer.

In Step C, the workpiece is annealed in order to at least partially densify the deposited passive core layer. Appropriate annealing conditions will be readily apparent to a skilled practitioner in the art.

In Step D, the passive core is then formed by etching the passive core layer. Dry etching is preferable for this step.

In Step E, the workpiece is annealed in order to flow the passive core, reducing roughness that was caused by etching. Appropriate annealing conditions will be readily apparent to a skilled practitioner in the art.

In Step F, a layer corresponding to the active core is then deposited.

In Step G, the workpiece is annealed, exemplarily at 800° C. for 2 hours in oxygen. The purpose of this annealing step is to stabilize the deposited film (i.e., against subsequent changes in structure, optical properties, and susceptibility to chemical attack).

In Step H, the active core is then formed by etching away a portion of the active core layer. A preferred etching process for Step H is ion milling, because this process is relatively nonselective with regard to the composition of the material being removed.

In optional Step I, the workpiece is desirably annealed in order to flow the active core, and thereby to reduce surface roughness created during Step H. Appropriate annealing conditions will be readily apparent to a skilled practitioner in the art.

In Step J, the workpiece is then annealed at a temperature of at least about 900° C. for a duration of at least about 1 hour in a reactive atmosphere such as very dry oxygen. (An appropriate grade of oxygen for this purpose is research grade,: i.e., 99.999% purity.) This step is believed to reduce contaminant levels.

In optional Step K, before the upper cladding layer is deposited, a protective film of an appropriate dielectric material is advantageously formed over the active core in order to prevent contamination of the active core by the upper cladding layer. Such contamination should be avoided because it can reduce the radiative lifetime of the $Er^{3+}$ ions below acceptable limits. Protective films that are effective for that purpose can be, e.g., silicon dioxide or phosphorus silicate films formed by sputtering or evaporative deposition. Such a protective film, if used, should be at least about 1000 Å thick.

In Step L, the upper cladding layer is then deposited.

Etching steps D and H are carried out such that after etching is completed, the remaining portions of the active and passive core layers describe at least one pair of elongated cores, comprising an active core overlying a passive core. The two cores have a common longitudinal axis. As is apparent in FIGS. 2 and 3, the active core is typically made smaller than the passive core in the longitudinal direction. As seen in FIG. 2, this leads to a pair of terminal passive core portions 70 not overlain by the active core. If the taper is formed with respect to the transverse direction, as shown in FIG. 2, the active core will also typically be smaller than the passive core in the transverse direction. However, if the taper is formed with respect to the vertical direction, as shown in FIG. 3, then the widths (i.e., in the transverse direction) of the active and passive cores are optionally made equal.

As noted above, an exemplary method of depositing the active core layer is by sputtering. According to this method, a glass target of a predetermined composition is provided. The silicon substrate and the target are both placed within a vacuum chamber that is evacuable to a pressure of about $3 \times 10^{-7}$ tort or less. The chamber is evacuated, and oxygen and argon are admitted. A radio-frequency discharge is produced, which leads to evaporation of material from the target and redeposition of such material on the substrate, as is well-known in the art.

As noted above, it is desirable for the deposited active core layer to contain at least two modifiers, in order to prevent cluttering of the erbium atoms and to provide a glass with advantageous properties. Sputtering of glass containing additional elements often has unsatisfactory results because the content of the additional elements in the deposited glass often tends to fall far below the content of the additional elements in the target. However, we have discovered that under appropriate sputtering conditions, the content of the additional elements in the deposited glass can be made relatively close to that of the target. We have found the following conditions in the sputtering chamber to be desirable in that regard: a pressure of 8 m Torr to 50 m Torr, and preferably about 27 m Torr; an argon-to-oxygen flow ratio in the range 10:1 to 0.3:1, and preferably about 0.5:1; a substrate temperature that can range freely between about 25° C. and about 70° C.; and if frequency of 13.6 MHz and power of about 50 W. We used a target 3 in. (7.6 cm) in diameter and a silicon-wafer substrate 4 in. (10.2 cm) in diameter. The target was situated about 1 to 3 inches (2.5–7.6 cm) from the substrate, preferably about 3 in. (7.6 cm).

The radiative lifetime of the lasing level of the excited erbium ions is desirably at least about 5 ms. In order to achieve such relatively high lifetimes, it is particularly important to include, during formation of the device, Step J, annealing in a reactive atmosphere.

In use, the signal and the pump radiation are combined and injected into the amplifier, exemplarily by means of directional coupler or wavelength division multiplexer 80, shown in FIG. 2. The amplified signal is extracted, exemplarily by wavelength division de-multiplexer 85 of FIG. 2, and unwanted pump radiation that would otherwise contaminate the amplified signal is eliminated, exemplarily by filtering. Such methods are well-known in the an, and need not be described here in detail.

In an alternate embodiment, the glass composition previously described is formed into a fiber. The process forming this glass into a fiber is disclosed in *Method of Making Optical Fiber With Low Melting Glass Core*, U.S. Ser. No. 521,934 which is filed Aug. 31, 1995 simultaneously herewith and is hereby incorporated by reference.

The foregoing discussion is for illustrative purposes only, and is not intended to limit the scope of the invention to a single-pass optical amplifier. For example, a laser or parametric oscillator is readily made by incorporating at least one optical feedback element with the inventive waveguiding structure. An appropriate such element is, e.g., a mirror or a distributed Bragg reflector. Such an arrangement is readily envisioned with reference to FIG. 2, substituting a mirror or Bragg reflector for one or both of elements 80 and 85.

EXAMPLE

Erbium-doped glass films, varying in thickness from about 0.8 μm at the edge to about 1.5 μm at the center, were formed on 4-in. (10.2-cm) diameter silicon wafer substrates by sputter deposition, substantially as described above. The target glass was in the form of a 3-inch diameter disc, mounted on a standard holder. The target glass composition was 65 mole percent of $SiO_2$; 25 mole percent $Al_2O_3$; 9.6 mole percent $La_2O_3$; and 0.4 mole percent $Er_2O_3$. The resulting glass composition was 65 mole percent silica and 25 mole percent alumina, 9.6 mole percent lanthanum oxide and 0.4 mole percent erbium. The deposited layers were analyzed by Rutherford backscattering. All three layers had erbium radiative lifetimes of about 8 milliseconds, and absolute erbium concentrations of about $1.6\times10^{20}$ atoms per cubic centimeter.

The invention claimed is:

1. An optical device, comprising:
   a) an elongate, active glass core which extends along a longitudinal axis and comprises silicon, oxygen, and erbium, the erbium being at least partially in the form of $Er^{3+}$ ions, the active core having a refractive index greater than about 1.5 at 633 nm;
   b) a glass cladding comprising at least one layer which at least partially surrounds the active core and has a refractive index which is smaller than the core refractive index;
   c) means for coupling signal radiation, having a signal wavelength, into the active core and means for coupling the signal radiation out of the active core; and
   d) means for coupling pump radiation into the active core such that pump radiation of an appropriate wavelength will excite at least some of the $Er^{3+}$ ions to a lasing level, leading to amplification of the signal radiation by stimulated emission,
   CHARACTERIZED IN THAT
   e) the device further comprises a substrate having a substantially planar principal surface;
   f) the active core is a body that overlies a portion of the principal surface;
   g) the cladding comprises a lower cladding layer disposed between the active core and the principal surface, and an upper cladding layer which overlies and partially surrounds the active core;
   h) the active core further comprises modifier comprised of at least two elements, one of which is selected from the group consisting of the Group IIIB, Group IVB and Group IIIA metals from the Mendeleef Periodic Table in an effective quantity to prevent clustering of erbium atoms and wherein none of the modifier elements are alkali metal or alkaline earth metals;
   i) the active core has an erbium-to-silicon atomic ratio of at least about 0.005 and an absolute erbium concentration of at least about $0.5\times10^{20}$ atoms per cubic centimeter; and
   j) the lasing level has a radiative lifetime of at least about 5 ms.

2. The optical device of claim 1, wherein the active glass core is adapted to guide the fundamental mode of the signal wavelength, and the means for coupling the signal radiation into and out of the active core are adapted to couple the signal radiation adiabatically.

3. The optical device of claim 2, further comprising an elongate, waveguiding, passive, glass core which extends along the longitudinal axis and is disposed between the lower cladding layer and the active core, the passive core being adapted to guide the fundamental mode of the signal radiation, means for coupling an optical signal and pump radiation into the passive core, and means for coupling signal radiation out of the passive core, wherein:
   the passive core is substantially free of erbium and has a refractive index that is smaller than the active core refractive index but larger than the upper and lower cladding refractive indices,
   and the means for coupling the signal radiation into and out of the active core comprises two further, tapered portions of the active core, each tapered portion extending between the central portion and an end and tapering toward the respective end such that the tapered portion is progressively constricted in at least one direction perpendicular to the longitudinal axis.

4. The optical device of claim 3, wherein the perpendicular direction is substantially parallel to the substrate principal surface.

5. The optical device of claim 3, wherein the perpendicular direction is substantially normal to the substrate principal surface.

6. The optical device of claim 3, wherein the passive core comprises phosphosilicate glass, the upper cladding layer comprises phosphosilicate glass, and the lower cladding layer comprises thermal silicon dioxide.

7. The optical device of claim 1, wherein one of the modifier elements is lathanum, wherein the amount of lanthanum in the active core is about 5 mole percent to about 40 mole percent.

8. The optical device of claim 7, wherein the second modifier element in the active core is a metal other than lathanum.

9. The optical device of claim 8 wherein the second modifier element is aluminum, present in the active core in an amount of about 5 mole percent to about 40 mole percent.

10. The optical device of claim 1, wherein the substrate comprises a silicon body.

11. The optical device of claim 1, wherein the active core has an absolute erbium concentration of at least about $1.4\times10^{20}$.

12. The optical device of claim 1, wherein the concentration of $Er^{3+}$ ions is substantially constant throughout the active core, and the active core is substantially free of radiation damage.

13. The optical device of claim 1, further comprising at least one optical feedback element, such that the device can function as a laser.

14. The optical device of claim 1, further comprising at least one optical feedback element, such that the device can function as a parametric oscillator.

* * * * *